(12) United States Patent
Choi et al.

(10) Patent No.: US 8,274,545 B2
(45) Date of Patent: Sep. 25, 2012

(54) APPARATUS AND METHOD FOR CASTING VIDEO DATA AND AUDIO DATA TO WEB DURING VIDEO TELEPHONY IN MOBILE COMMUNICATION TERMINAL

(75) Inventors: Woo-Young Choi, Incheon (KR); Sung-Ik Park, Hwaseong-si (KR); Min-Cheol Kang, Suwon-si (KR)

(73) Assignee: Samsung Electric Co., Ltd (KR)

( * ) Notice: Subject to any disclaimer, the term of this patent is extended or adjusted under 35 U.S.C. 154(b) by 1517 days.

(21) Appl. No.: 11/809,183

(22) Filed: May 31, 2007

(65) Prior Publication Data
US 2007/0285499 A1  Dec. 13, 2007

(30) Foreign Application Priority Data
Jun. 7, 2006 (KR) .................. 10-2006-0050885

(51) Int. Cl.
*H04N 7/14* (2006.01)

(52) U.S. Cl. ................. 348/14.02; 348/14.01

(58) Field of Classification Search ............... 348/14.02, 348/14.01, 14.08, 14.09; 370/260
See application file for complete search history.

(56) References Cited

U.S. PATENT DOCUMENTS

| | | | |
|---|---|---|---|
| 7,227,930 B1 * | 6/2007 | Othmer et al. .................. 379/85 |
| 7,328,239 B1 * | 2/2008 | Berberian et al. ............ 370/260 |
| 2004/0119814 A1 * | 6/2004 | Clisham et al. ............ 348/14.08 |
| 2004/0148635 A1 * | 7/2004 | Merchant ...................... 725/109 |
| 2004/0207724 A1 * | 10/2004 | Crouch et al. ............. 348/14.09 |
| 2007/0296805 A1 * | 12/2007 | Tedenvall et al. .......... 348/14.01 |

* cited by examiner

*Primary Examiner* — Stella Woo
(74) *Attorney, Agent, or Firm* — The Farrell Law Firm, P.C.

(57) ABSTRACT

An apparatus and a method for casting video and audio data to a web during video telephony in a mobile communication terminal are provided. The method includes sending a transmitting request message to a counterpart terminal, if a transmitting request menu is selected in a video telephony mode, sending authentication information to a server, if a transmitting accept message is received from the counterpart terminal, and transmitting video telephony data to the server, if an authentication complete message is received from the server.

35 Claims, 7 Drawing Sheets

FIG.6F    FIG.6G
FIG.6H    FIG.6I

APPARATUS AND METHOD FOR CASTING VIDEO DATA AND AUDIO DATA TO WEB DURING VIDEO TELEPHONY IN MOBILE COMMUNICATION TERMINAL

PRIORITY

This application claims priority under 35 U.S.C. §119(a) to a Korean Patent Application filed in the Korean Intellectual Property Office on Jun. 7, 2006 and assigned Serial No. 2006-50885, the contents of which are incorporated herein by reference.

BACKGROUND OF THE INVENTION

1. Field of the Invention

The present invention relates to a mobile communication terminal, and in particular, to an apparatus and a method for casting video and audio data to a web during video telephony in a mobile communication terminal.

2. Description of the Related Art

The International Mobile Telecommunications-2000 (IMT-2000) system, establishes a global standard for third generation wireless communication which enables a plurality of undefined users to conduct wireless communication with their mobile phones by constructing a global wireless communications network. The IMT-2000 system provides the users with not only wireless voice communication, but also with file and video services that include Internet service and video telephony service.

The IMT-2000 system was proposed as a video telephony system by which a user conducts video communication with a counterpart through his video communication terminal, and the system includes Wideband Code Division Multiple Access (WCDMA) system and Evolution Data Optimized (EVDO) system.

For example, a terminal of a video telephony system captures the moving image of a user, compresses the captured moving image and transmits it to the counterpart terminal. Accordingly, the receiving terminal de-compresses and recovers the received moving image in its original state and displays the recovered contents through a display unit. As a result, users of the transmitting and receiving terminals can see and talk to each other, simultaneously. The users may also store the contents of the communication in their terminals, or may send in real-time basis the moving image or video data stored in their terminals to the counterpart terminals.

The terminals of the video telephony system exchange a moving image stream through a packet switched, or circuit switched network, and commonly use H.245 protocol control. The H.245 protocol negotiates capabilities and channels of the terminals by transmitting and receiving control messages. These control messages usually include capability exchange, opening and closing of logical channels, mode request, flow control and other general commands and instructions. The control messages may also be used to support the capability exchange, master and slave determination, logical channel signaling, bi-directional logical channel signaling, closed logical channel signaling, mode request, and delay command. Additionally, the H.245 protocol controls compatibility negotiation between terminals and the Quality of Service (QoS). The QoS includes frame/bitrate adjustment, image size adjustment, and fast update request.

Currently, the video telephony system and terminals provide one-to-one, or one-to-multiparty communications. The communications are carried out only with counterpart(s) recognized by the user, and the contents of the video communication are not provided to a third party. However, more improved and various additional services could be provided, if the contents of the video communication are cast to the third party.

SUMMARY OF THE INVENTION

One aspect of the present invention is to substantially solve at least the above problems and/or disadvantages and to provide at least the advantages below. Accordingly, an aspect of the present invention is to provide an apparatus and a method for casting video and audio data to a web during video telephony in a mobile communication terminal.

Another aspect of the present invention is to provide an apparatus and a method for broadcasting content of current video telephony to a third party user subscribed to a web casting service during video telephony in a mobile communication terminal.

Yet another aspect of the present invention is to provide an apparatus and a method for acquiring an agreement of a counterpart terminal, by going through an authentication process with a web server, and casting the video telephony data to the web server so as to provide the third party users that use the Internet Web Browser or PC Clients for Video telephony casting with the video telephony data during video telephony in a mobile communication system.

Another aspect of the present invention is to provide a method for transmitting video telephony data during video telephony via a mobile communication terminal. The method includes sending a transmitting request message to a counterpart terminal if a transmitting request menu is selected in a video telephony mode; sending authentication information to a server, if a transmitting accept message is received from the counterpart terminal; and transmitting video telephony data to the server, if an authentication complete message is received from the server.

Another aspect of the present invention is to provide a method for approving a transmitting video telephony data during video telephony via a mobile communication terminal. The method includes displaying a transmitting request message through a display unit, if the transmitting request message is received from a counterpart terminal operating a video telephony mode; and sending a transmitting accept message to the counterpart terminal, if a key to accept the transmitting request is input.

Yet another aspect of the present invention is to provide a method for transmitting video telephony data in a server during video telephony. The method includes if authentication information is received from a terminal, determining whether the terminal is subscribed to a transmitting service; sending authentication complete message to the terminal, if the terminal is subscribed to the transmitting service; and if video telephony data is received from the terminal, transmitting the received video telephony data.

Yet another aspect of the present invention is to provide an apparatus for transmitting video telephony data during video telephony in a mobile communication terminal. The apparatus includes a first terminal for sending a transmitting request message to a second terminal, if a transmitting request menu is selected in a video telephony mode with the second terminal, sending authentication information to a server, if a transmitting accept message is received from the second terminal, and transmitting video telephony data to the server, if an authentication complete message is received from the server; a second terminal for displaying a transmitting request message through a display unit, if the transmitting request message is received from the first terminal in a video telephony mode with the first terminal, and sending the transmitting accept message to the first terminal, if a key to accept transmitting request is input; and a server for determining whether the first terminal is subscribed to the transmitting service, if authentication information is received from the first terminal, sending the authentication complete message if the first terminal is subscribed to the transmitting service, and transmitting video telephony data, if the video telephony data is received from the first terminal.

BRIEF DESCRIPTION OF THE DRAWINGS

The above and other objects, features and advantages of the present invention will become more apparent from the following detailed description when taken in conjunction with the accompanying drawings in which:

FIGS. 6A to 6I illustrate screen shot methods of web casting during a video telephony of video data via a mobile communication system according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is applicable every transmitting service, a web casting service is illustrated by way of example.

Figure 1:
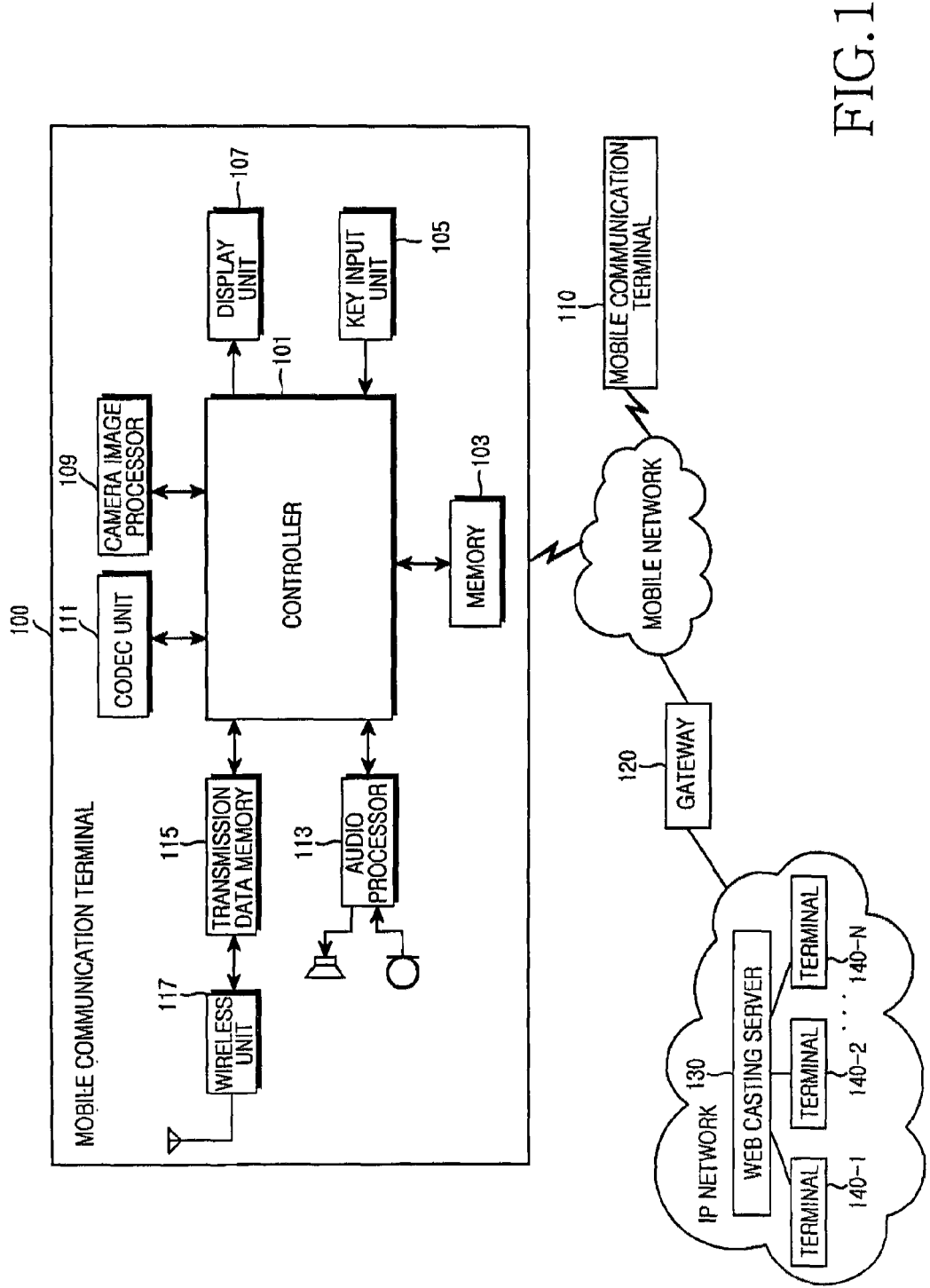
FIG. 1 is a block diagram of mobile communication terminals and other constituent devices of a mobile communication system according to the present invention.

FIG. 1 shows a block diagram of mobile communication terminals and other constituent devices of a mobile communication system according to the present invention.

In FIG. 1, mobile communication terminals 100 and 110 each include a controller 101, a memory 103, a key input unit 105, a display unit 107, a camera image processor 109, a coder-decoder (CODEC) unit 111, an audio processor 113, a transmission data memory 115, and a wireless unit 117. The mobile communication system includes the mobile communication terminals 100, 110, a gateway 120, a web casting server 130, and terminals 140-1, 140-2, . . . , 140-N.

The controller 101 controls the overall operations of the mobile communication terminals 100 and 110. For example, the controller 101 may perform process and control functions for data, audio, and video communication. Additionally, the controller 101 may perform a processing function for of audio and video data casting on the web during video telephony. Accordingly, the controller 101 may carry out data processing and controlling under H.245 protocol, which includes web casting request, web casting data selection, information setup such as data security setup, and web casting start. The controller 101 may also transmit user authentication information and multimedia frame information to the web casting server 130 for the web casting.

As further illustrated in FIG. 1, memory 103 may be Read Only Memory (ROM), Random Access Memory (RAM), and flash ROM. The ROM may be programmed to store microcodes comprising processing and controlling programs used by the controller 101, and other reference data. Accordingly, the ROM may also store a program to cast audio and video data to a designated web location during video telephony. The RAM operates as a working memory of the controller 101, and stores temporary data which are generated as the programs are executed. The flash ROM stores updatable data, such as pictures, moving images or messages. Moreover, the memory 103 may also store basic web casting addresses, user authentication information, or CODEC information.

The key input unit 105 comprises a plurality of function keys such as numeral keys 0~9, menu button (MENU), cancel button (DELETE), confirm button, call button (TALK), ending button (END), photographing button, Internet access button, navigation keys or direction keys (▲/▼/▶/◀). The key input unit 105 provides the controller 101 with key input data with respect to the keys pressed by the terminal user. The display unit 107 may display status information generated during the operations of the mobile communication terminals 100 and 110. The display unit 107, which may comprise a color Liquid Crystal Display (LCD), may be adapted to display a limited number of characters, or a large volume of moving or still images.

The camera image processor 109 comprise a camera sensor which converts optical signal detected during the capturing of images into electric signals, a signal processor which converts analog video signal captured at the camera sensor into digital video signal, and an image processor which receives the digital video signal from the signal processor and generates screen video data to be displayed through the display unit 107. Further, the camera image processor 109 operates to generate video data according to a mode set under the control of the controller 101 and provides the controller 101 with the generated data. In particular, the camera image processor 109 generates video data based on the input user image. The controller 101 outputs the video data to the CODEC unit 111. In one embodiment, the camera sensor may be implemented as a Charged Coupled Device (CCD) sensor, and the signal processor may be implemented as a Digital Signal Processor (DSP).

The CODEC unit 111 operates to encode the video data/audio data/data input from the controller 101 according to a preset format, or decode the coded video data, or audio data, or both of the video and audio data into original forms and outputs it to the controller 101. The controller 101 outputs the audio data input from the CODEC unit 111 to the audio processor 113, and outputs the input video data to the display unit 107.

The audio processor 113 converts audio data input from the controller 101 into audible sound and reproduces the sound through a speaker. In addition, the audio processor 113 also converts the audio signal generated by a microphone into audio data and outputs it to the controller 101. The controller 101 outputs the audio data to the CODEC unit 111.

The transmission data memory 115 provides a transmission means for the transmission of video telephony data and stores video data/audio data/frame input from the controller 101. The wireless unit 117 processes the frequency up-conversion and amplification of the data, which is input from the controller 101 via the transmission data memory 115 and sends out a wireless signal. The wireless unit 117 also provides for low-noise amplification and frequency down-conversion of the incoming wireless signal and outputs the data to the controller 101 via the transmission data memory 115. Moreover, the wireless unit 117 transmits on a real-time basis the video telephony data stored in the transmission data memory 115 to the counterpart terminal 110 and the web casting server 130 so as to transmit web casting data. In operation, the video telephony data is transmitted over a mobile network to the counterpart terminal 110 via a gateway 120 that transmits the video telephony data to the web casting server 130.

The gateway 120 transmits the video telephony data and controls the information received by terminal 100, over the mobile network as it is processed by the web casting server 130 through the IP network.

The web casting server 130 casts the video telephony data of the terminal 100 and received from the gateway 120, to subscriber terminals 140-1, 140-2, . . . , 140-N. Accordingly, the web casting server 130 first checks the user authentication information received from the terminal 100 and then determines if the terminals are subscribed to the web casting service. The web casting server 130 subsequently converts the video telephony data to suit the format of the web moving image using the multimedia frame information received from the terminal 100 and then casts the video telephony data to the subscriber terminals 140-1, 140-2, . . . , 140-N. The subscriber terminals 140-1, 140-2, . . . , 140-N are to the terminals located in the IP network and support the Internet Web Browser or PC Clients for VT casting.

Figure 2:
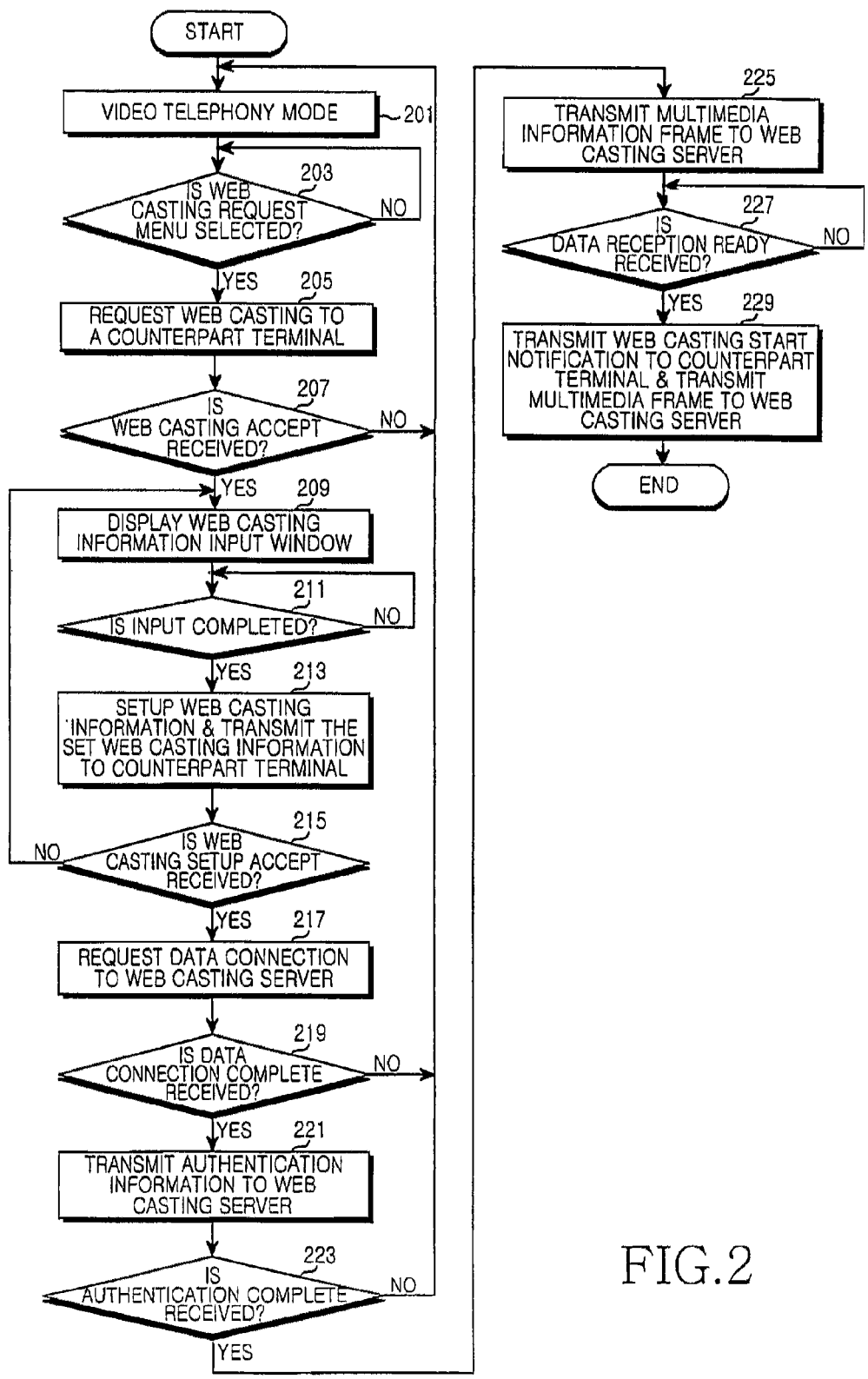
FIG. 2 is a flowchart illustrating a method for requesting a web casting during video telephony in a mobile telecommunication terminal according to the present invention.

FIG. 2 is a flowchart illustrating a method for requesting a web casting during video telephony in a mobile communication terminal according to an exemplary embodiment of the present invention.

In FIG. 2, the terminal 100 provides the user with video telephony service, by exchanging protocol with the counterpart terminal 110 through the video telephony system in step 201. Accordingly, the terminal 100 exchanges CODEC information and connection information related with the video telephony service with the counterpart terminal 110, conducts the video telephony service by transmitting and receiving video and audio data according to the CODEC information and the connection information. During a video telephony process a user may suggest to the counterpart user to web cast the current video telephony. The terminal 100 then goes to step 203 and determines whether a web casting request menu for the video telephony service is selected in response to key manipulation by the user. If the web casting request menu is selected, the terminal 100 transmits a web casting request message to the counterpart terminal 110 to request the start of web casting in step 205.

The terminal 100 determines whether a web casting accept message is received from the counterpart terminal 110 in step 207. If the web casting accept message is received, the terminal 100 displays a web casting information input window through the display unit 107 in step 209 so that the user can set up the web casting information. The web casting information may include, for example, the address of the web casting server 130, the data transmitted for the web casting, or other security options. A server for the web casting service may be predefined, and in this case, the address of the server may appear as the default address on the web casting information input window. Accordingly, the user may set the server for web casting by selecting the default address, or alternatively, directly input an address to set the address of the web casting server 130. The web casting information input window may show different types of the web casting data, so that the user can select video telephony data to be transmitted to the counterpart terminal 110 during a web casting by selecting one or more types of data via the web casting information input window. The web casting data may include video data, audio data, or both. The web casting information input window may display security options with respect to the web cast data, such as record option, or duration (e.g., a week) of recorded data, and the user may select whether to record the web cast data and if so, the period of keeping the data through the web casting information input window. In the meantime, if a web casting reject message is received from the counterpart terminal 110 in step 207, the terminal 100 ends the initial stages of the web casting process and returns to step 201.

The terminal 100 determines if there is a key input to end the web casting information input in step 211, and if so, goes to step 213 to set up the input web casting information and transmit the web casting information to the counterpart terminal 110.

The terminal 100 determines if a web casting set up accept message is received from the counterpart terminal 110 in step 215. If a web set up casting reject message is received from the counterpart terminal 110, the terminal 100 returns to step 209 and displays the web casting information input window so that the user can set up the information differently. Accordingly, the users' rights to the moving image of the video telephony are protected, because the users can select the data to cast. If a web casting set up accept message is received from the counterpart terminal 110 in step 215, the terminal 100 goes to step 217 to transmit a data connection request message to the web casting server 130.

The terminal 100 determines if a data connection complete message is received from the web casting server 130 in step 219. If not, the terminal 100 returns to step 201. If a data connection complete message is received, however, the terminal 100 transmits authentication information to the web casting server 130 for user authentication in step 221.

The terminal 100 determines if an authentication complete message is received from the web casting server 130 in step 223. If not, the terminal 100 then returns to step 201. However, if the authentication complete message is received from the web casting server 130, the terminal 100 goes to step 225 to transmit a multimedia information frame to the web casting server. The multimedia information frame may include various CODEC information and other information necessary for the processing of video and audio data, such as web casting setup information, or a data information frame rate. The data information frame rate indicates the proportion of the audio data, video data, and data information in the video telephony data. In other words, the terminal 100 transmits the first frame data containing video telephony multimedia information to the web casting server 130 for the casting of the video telephony data.

The terminal 100 determines if a data reception ready message is received from the web casting server 130 in step 227. If so, the terminal 100 goes to step 229 and transmits a web casting start message to the counterpart terminal 110, and begins the web casting by transmitting the multimedia frame to the web casting server. As a result, video and audio data of the current video telephony is transmitted to the web casting server 130 in real time. The terminal 100 ends the process according to the exemplary embodiment of the present invention.

Figure 3:
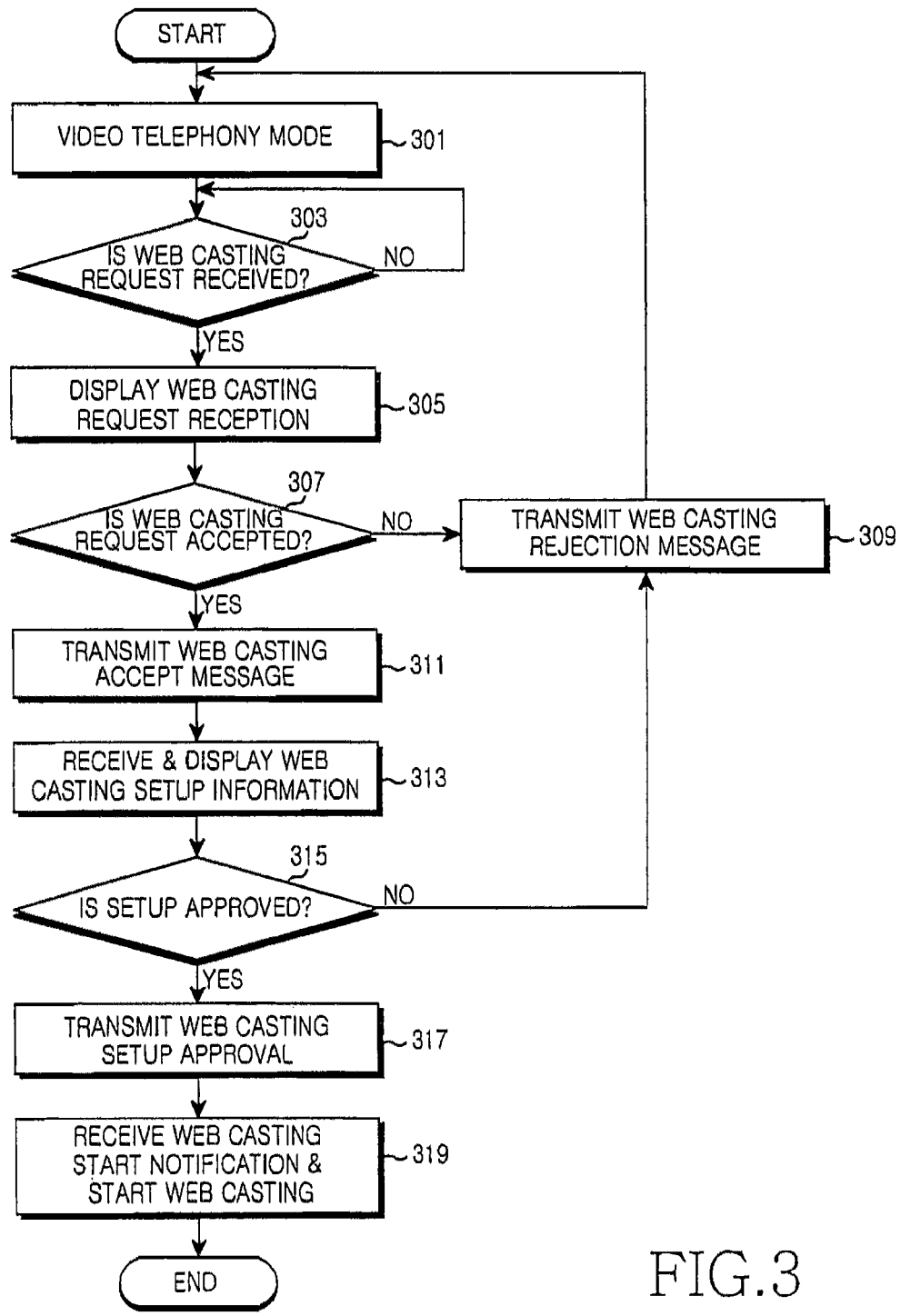
FIG. 3 is a flowchart illustrating a method for authenticating a web casting during a video telephony via a mobile communication terminal according to the present invention.

FIG. 3 is a flowchart illustrating a method for authenticating web casting during video telephony in a mobile communication terminal according to an exemplary embodiment of the present invention.

In FIG. 3, the terminal 100 exchanges protocols with the counterpart terminal 110 via the video telephony system, and thus provides video telephony service to the user in step 301. The terminal 100 goes to step 303 to determine if a web casting request message is received from the counterpart terminal 110. If so, the terminal 100 displays through the display unit 107 a message indicating that the web casting request message is received from the counterpart terminal 110 in step 305.

The terminal 100 checks the user's key manipulation and determines if the web casting request is accepted in step 307. If the web casting request is accepted, the terminal 100 transmits a web casting accept message to the counterpart terminal 110 in step 311. If the web casting request is rejected, the terminal 100 transmits a web casting reject message to the counterpart terminal 110 in step 309, and returns to step 301.

The terminal 100 receives web casting setup information from the counterpart terminal 110 in step 313, displays the received information through the display unit 107, and goes to step 315 to determine if there is a key input to accept the web casting setup. If a key input to reject the web casting setup is detected, the terminal 100 goes to step 309 and transmits a web casting reject message to the counterpart terminal 110 and returns to step 301. However, if a key input to accept the web casting setup is detected, the terminal 100 transmits a web casting setup accept message to the counterpart terminal 110 in step 317. The terminal 100 receives a web casting start message from the counterpart terminal 110 and begins the web casting in step 319. The terminal 100 then ends the process according to the present invention.

Figure 4:
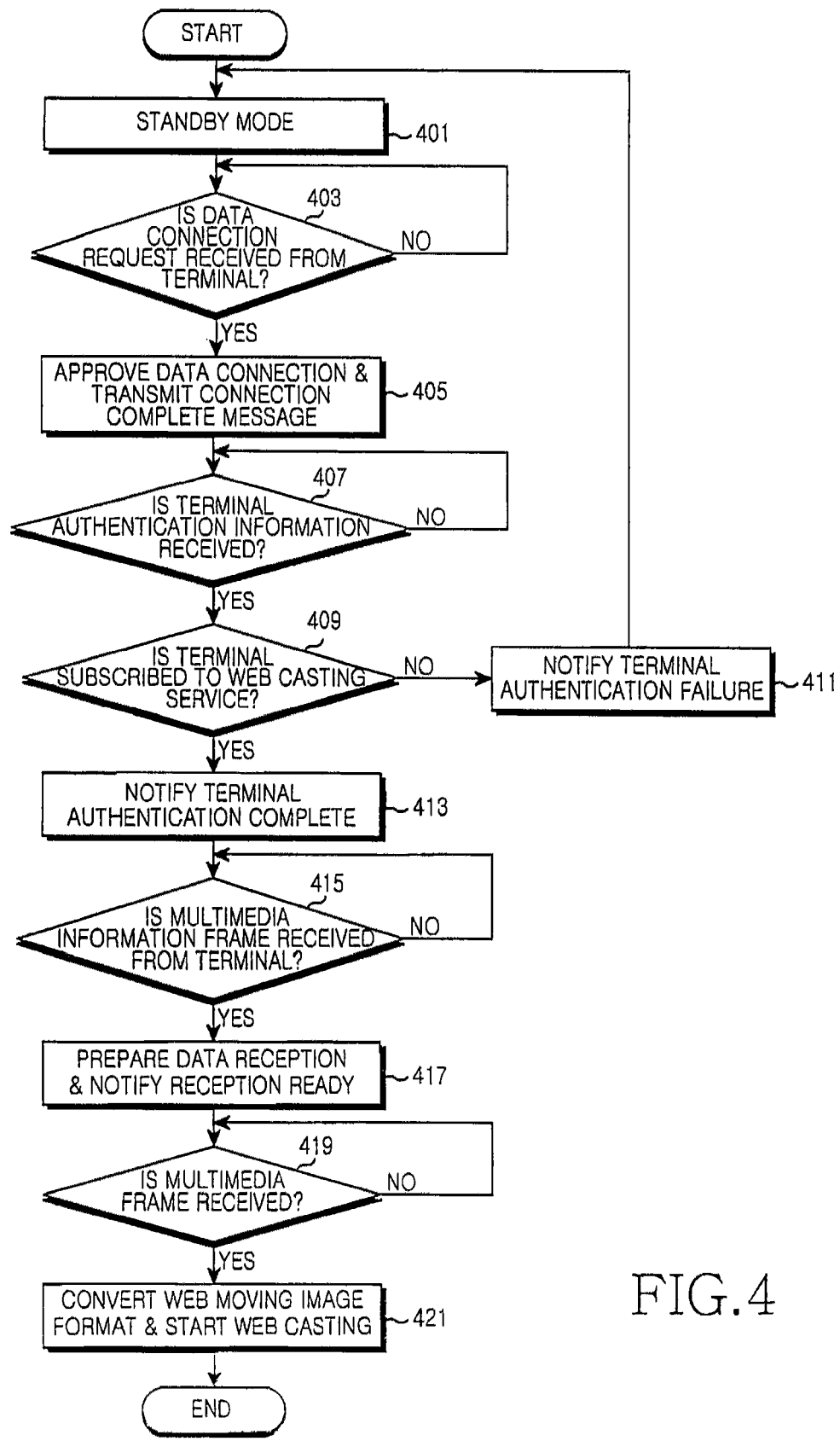
FIG. 4 is a flowchart illustrating a method for web casting via a web casting server during video telephony according to the present invention.

FIG. 4 is a flowchart illustrating a method for web casting by a web casting server during a video telephony according to an exemplary embodiment of the present invention.

In FIG. 4, the web casting server 130 goes from the standby mode in step 401 to step 403 to determine if a data connection request message is received from the terminal 100. If so, the web casting server 130 approves the data connection and transmits a data connection complete message to the terminal 100 in step 405.

The web casting server 130 determines if terminal authentication information is received from the terminal 100 in step 407. If the terminal authentication information is received, the web casting server 130 determines if the terminal 100 is subscribed to the web casting service in step 409, using the received terminal authentication information. If the terminal 100 is not the subscribed terminal, the web casting server 130 transmits an authentication failure message to the terminal 100 in step 411, and returns to step 401. If the terminal 100 is the subscribed terminal, the web casting server 130 then goes to step 413 to transmit an authentication complete message to the terminal 100.

The web casting server 130 determines if a multimedia information frame is received from the terminal 100 in step 415. If so, the web casting server 130 prepares reception of the data using the first received multimedia information frame in step 417, and transmits a data reception ready message to the terminal 100. The multimedia information frame may include various CODEC information and other necessary information for the processing of video and audio data, such as web casting setup information, or a data information frame rate. The data information frame rate indicates the proportion of the audio data, video data, and data information contained in the video telephony data. In other words, the terminal 100 transmits the first frame data containing video telephony multimedia information to the web casting server 130 for the casting of the video telephony data by parsing the multimedia information frame, the web casting server 130 acquires CODEC information and determines the format of the moving image for the web casting service.

The web casting server 130 determines if the multimedia frame is received from the terminal 100 in step 419. If so, the web casting server 130 converts the format of the received multimedia frame into a moving image format suitable for the environments of the respective clients, to generate multimedia data of a new format that is, the web casting server 130 converts the received multimedia data into moving image for web casting, and begins a streaming service, i.e., web casting, which provides the respective clients with the multimedia data in step 421. The web casting server 130 ends the process according to the present invention.

Figure 5:
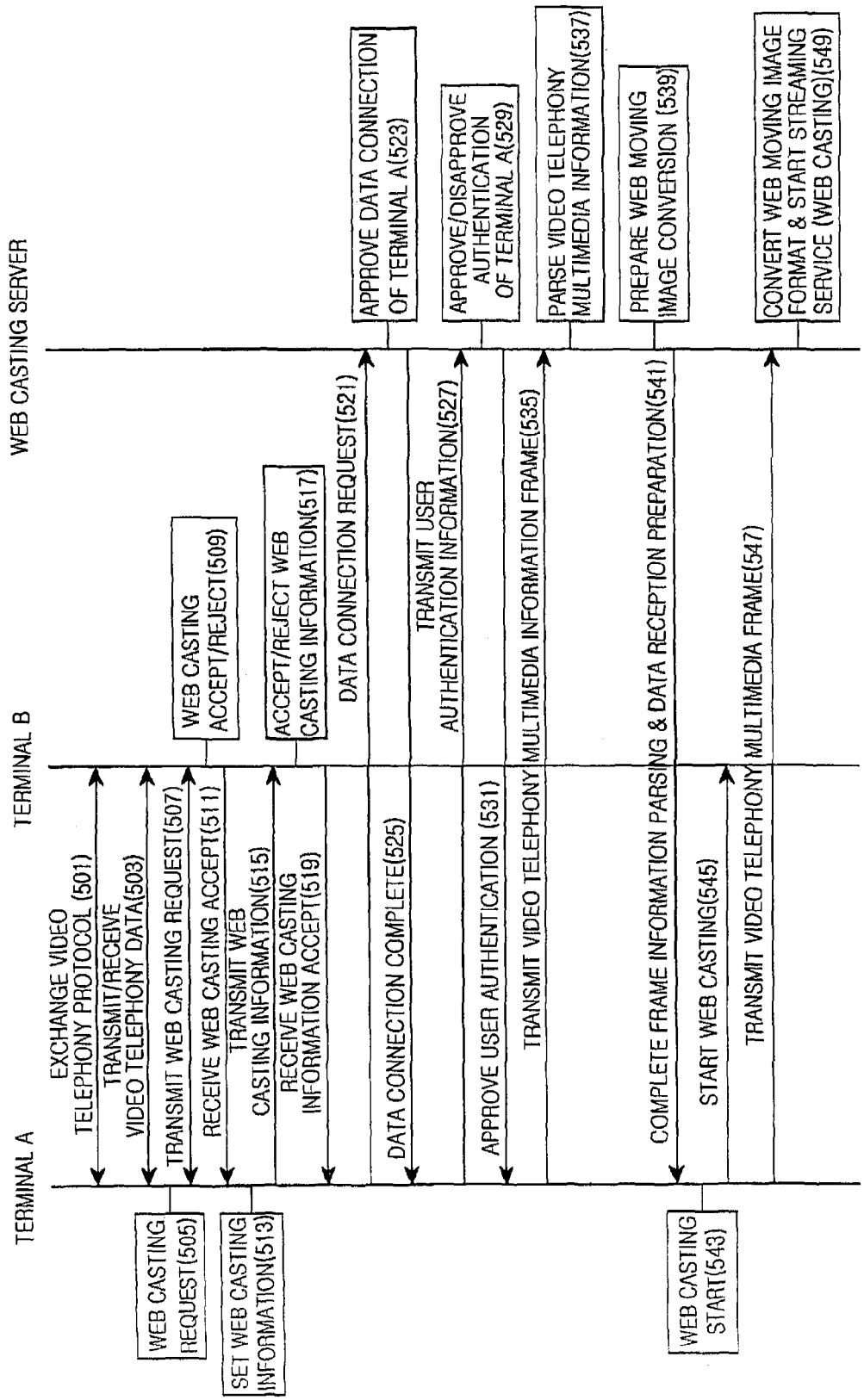
FIG. 5 illustrates an example of a signaling flow diagram between a terminal and a web casting server used for web casting video data during video telephony via a mobile communication system to the present invention.

FIG. 5 illustrates an example of signaling between a terminal A and a web casting server during video telephony in a mobile communication system according to the present invention.

In FIG. 5, terminal A exchanges video telephony protocol with terminal B in step 501, and proceeds with the video telephony by transmitting and receiving video and audio data in step 503. If a user of terminal A requests web casting in step 505, then terminal A transmits a web casting request message to the terminal B in step 507, and terminal B transmits a web casting accept or reject message to terminal A in step 511 according to the selection of the user of terminal B in step 509 whether to accept or reject the request.

If a web casting accept message is received from terminal B in step 511, terminal A receives web casting information according to the input by the user, sets up the input web casting information in step 513, and transmits the set web casting information to terminal B in step 515. Terminal B transmits a web casting information accept or reject message to the terminal A in step 519 in accordance with the determination of the user in step 517 whether to accept or reject the web casting information.

If a web casting accept message is received from terminal B in step 519, terminal A requests the web casting server 130 for data connection in step 521. The web casting server 130 approves the data connection of terminal A in step 523, and transmits a data connection complete message to terminal A in step 525.

Terminal A, in response to the data connection complete message, transmits user authentication information to the web casting server 130 in step 527. Accordingly, the web casting server 130 determines whether to authenticate or disapprove terminal A through the authentication process using the received information in step 529, and transmits a user authentication accept or reject message to terminal A in step 531.

If an user authentication accept message is received from the web casting server in step 531, terminal A transmits a video telephony multimedia information frame to the web casting server in step 535. The web casting server 130 parses the video telephony multimedia information frame in step 537, completes the preparation for the web moving image conversion in step 539, and transmits a frame information parsing complete and video/audio data reception ready message to terminal A in step 541.

Terminal A starts web casting in step 543, and thus transmits a web casting start message to the terminal B in step 545, and transmits on a real-time basis the video telephony multimedia, that is, a video and audio data frame, to the web casting server 130 in step 547. The web casting server 130 converts the incoming video telephony multimedia into web moving image format, and starts a streaming service in step 549.

FIGS. 6A to 6I illustrate screen shots of web casting methods during video telephony in a mobile communication system according to an exemplary embodiment of the present invention.

Figure 6A:
Figure 6B:
Figure 6C:
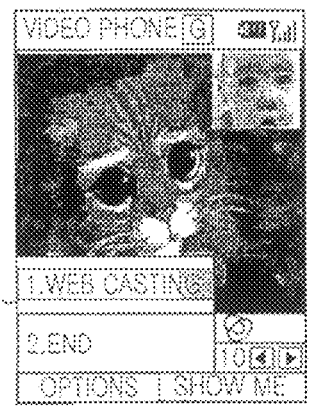
Figure 6D:
Figure 6E:
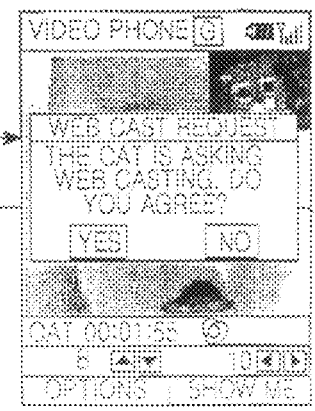

In FIGS. 6A and 6B, a 'cat' as the user of terminal A is in video telephony with a 'baby' as the user of terminal B. If the cat selects a web casting start menu 601 during the video telephony (FIG. 6C), terminal A shows a popup message 602 such as "Currently asking baby's approval. Please wait." through the display unit 107 (FIG. 6D), and transmits a web casting request message to terminal B. If a web casting request message from the terminal A is received at terminal B, terminal B shows a popup message 603 such as "The cat is asking web casting. Do you agree?" (FIG. 6E), to which the user of terminal B may accept or reject. When the user of terminal B inputs a key to select web casting acceptance or rejection, terminal B transmits an accept or reject message to terminal A according to the selection of the user.

If a web casting accept message is received from terminal B, terminal A shows a popup message 604 for a web casting setup (FIG. 6F) and receives user input of web casting information. The popup message 604 for the web casting setup may show the address of the predefined web casting service server as a default server. In this case, the user may set the web casting server 130 by selecting the default address. Alternatively, the user may directly input an address of the web casting server 130. The popup message 604 for the web casting setup may show the types of web casting data so that the user can select one or more of the data types of the video telephony data to transmit to the counterpart terminal. The web casting data types may include video data, audio data or both. Additionally, the popup message 604 for the web casting setup shows data security option, such as record option, or duration (e.g. one week) of recorded data so that the user can select desired conditions regarding whether to record the web cast data and how long to keep the recorded data.

Terminal A sets the web casting information according to the input by the user, and transmits the web casting setup information to terminal B. Terminal B displays a popup message 605 through the display unit 107 to indicate the web casting information received from terminal A (FIG. 6G), and waits for the acceptance or rejection of the user. If the user of terminal B inputs a key to select acceptance or rejection of the web casting setup, then terminal B transmits a setup accept or reject message to terminal A according to the user selection.

Terminal A starts web casting with terminal B (FIGS. 6H and 6I), if the web casting accept message is received from terminal B. Terminal A operates as a web casting master, and terminal B operates as a web casting guest, and the web casting data set by the user of terminal A is provided to the users using the Internet Web Brower or the PC Clients for VT casting.

As explained above, according to exemplary embodiments of the present invention, a terminal of a mobile communication system casts video telephony data to a web server, only after obtaining agreement of its counterpart and authentication of the web server. Accordingly, clearness and openness of the communication are possible because the contents of the video telephony can be provided to a third party subscribed to the web casting service, and limitations of the video telephony can be eliminated because the video telephony can be generated as video contents and broadcast.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting video telephony data during video telephony in a mobile communication terminal, the method comprising:
   sending a transmitting request message to a counterpart terminal, if a transmitting request menu is selected in a video telephony mode;
   sending authentication information to a server, if a transmitting accept message is received from the counterpart terminal; and
   transmitting video telephony data to the server, if an authentication complete message is received from the server.

2. The method of claim 1, wherein sending the authentication information comprises:
   setting transmitting information and sending the set transmitting information to the counterpart terminal, if the transmitting accept message is received from the counterpart terminal;
   sending a data connection request message to the server, if a transmitting setup accept message is received from the counterpart terminal; and
   sending the authentication information to the server, if a data connection complete message is received from the server.

3. The method of claim 2, wherein setting the transmitting information comprises:
   displaying a transmitting information input window through a display unit; and
   if a transmitting information input complete key is input, setting the input transmitting information.

4. The method of claim 2, wherein the transmitting information includes at least one of an address of the server, video telephony data for transmitting, information as to whether transmitting data is storable, and a valid period of the transmitting data.

5. The method of claim 1, wherein transmitting the video telephony data to the server comprises:
   sending a multimedia information frame to the server, if an authentication complete message is received from the server; and
   transmitting video telephony data to the server if a data reception ready message is received from the server.

6. The method of claim 5, further comprising sending a transmitting start message to the counterpart terminal, if the data reception ready message is received from the server.

7. The method of claim 5, wherein the multimedia information frame includes at least one of coder-decoder (CODEC) information for the processing of the video telephony data, transmitting setup information, and a proportion of video telephony data information frame.

8. The method of claim 1, further comprising not conducting the transmitting, if a transmitting rejection message is received.

9. The method of claim 2, further comprising not conducting the transmitting, if a transmitting setup rejection message is received from the counterpart terminal.

10. The method of claim 1, wherein the video telephony data is content of current video telephony, includes at least one of video and audio data.

11. The method of claim 1, wherein the transmitting video telephony data is web casting.

12. A method for approving a transmitting video telephony data during video telephony in a mobile communication terminal, the method comprising:

displaying a transmitting request message through a display unit, if the transmitting request message is received from a counterpart terminal in a video telephony mode; and sending a transmitting accept message to the counterpart terminal, if a key to accept the transmitting request is input.

13. The method of claim 12, further comprising sending a transmitting rejection message to the counterpart terminal, if a key to reject the transmitting request is input.

14. The method of claim 12, further comprising:

displaying transmitting setup information through a display unit, if the transmitting setup information is received from the counterpart terminal; and sending a transmitting setup accept message to the counterpart terminal, if a key to accept transmitting setup is input.

15. The method of claim 14, further comprising sending a transmitting setup reject message to the counterpart terminal, if a key to reject transmitting setup is input.

16. The method of claim 14, further comprising receiving a transmitting start message from the counterpart terminal.

17. The method of claim 12, wherein the transmitting video telephony data is web casting.

18. A method for transmitting video telephony data in server during video telephony, the method comprising:

if authentication information is received from a terminal, determining whether the terminal is subscribed to a transmitting service;

sending an authentication complete message to the terminal, if the terminal is subscribed to the transmitting service; and if video telephony data is received from the terminal, transmitting the received video telephony data to another terminal.

19. The method of claim 18, further comprising approving a data connection of the terminal and sending a data connection complete message to the terminal, if a data connection request message is received from the terminal.

20. The method of claim 18, further comprising sending an authentication failure message to the terminal.

21. The method of claim 18, further comprising:

sending a data reception ready message to the terminal, if a multimedia information frame is received from the terminal; and converting the data type of video telephony data using the received multimedia information frame, if the video telephony data is received from the terminal.

22. The method of claim 21, further comprising completing a preparation for web moving image conversion by parsing the received multimedia information frame.

23. The method of claim 21, wherein the multimedia information frame includes at least one of coder-decoder (CODEC) information for the processing of the video telephony data, transmitting setup information, and a proportion of video telephony data information frame.

24. The method of claim 18, wherein the video telephony data is content of current video telephony, includes at least one of video and audio data.

25. The method of claim 18, wherein the transmitting video telephony data is web casting.

26. An apparatus for transmitting video telephony data during video telephony in a mobile communication terminal, the apparatus comprising:

a first terminal for sending a transmitting request message to a second terminal if a transmitting request menu is selected in a video telephony mode with the second terminal, sending authentication information to a server if a transmitting accept message is received from the second terminal, and transmitting video telephony data to the server if an authentication complete message is received from the server;

the second terminal for displaying a transmitting request message through a display unit if the transmitting request message is received from the first terminal in a video telephony mode with the first terminal, and sending the transmitting accept message to the first terminal if a key to accept transmitting request is input; and a server for determining whether the first terminal is subscribed to the transmitting service if authentication information is received from the first terminal, sending the authentication complete message if the first terminal is subscribed to the transmitting service, and transmitting video telephony data if the video telephony data is received from the first terminal.

27. The apparatus of claim 26, wherein the first terminal sets transmitting information and sends the set transmitting information to the second terminal, if the transmitting accept message is received from the second terminal; the first terminal sends the data connection request message to the server, if the transmitting setup accept message is received from the second terminal; and the first terminal sends the authentication information to the server, if the data connection complete message is received from the server.

28. The apparatus of claim 26, wherein the first terminal sends a multimedia information frame if an authentication complete message is received from the server; and the first terminal transmits video telephony data to the server, if a data reception ready message is received from the server.

29. The apparatus of claim 26, wherein the second terminal displays the received information through a display unit, if transmitting setup information is received from the first terminal; and the second terminal sends a transmitting setup accept message to the first terminal, if a key to accept transmitting setup is input.

30. The apparatus of claim 26, wherein the server approves a data connection of the first terminal and sends a data connection complete message to the first terminal, if a data connection request message is received from the first terminal; the server parses the received multimedia information frame, completes a preparation for web moving image conversion, and sends a data reception ready message to the first terminal, if a multimedia information frame is received from the first terminal; and the server converts the data type of the video telephony data using the received multimedia information frame, if video telephony data is received from the first terminal.

31. The apparatus of claim 26, wherein the video telephony data is content of current video telephony, includes at least one of video and audio data.

32. The apparatus of claim 26, wherein the transmitting video telephony data is web casting.

33. A mobile communication terminal for transmitting video telephony data during video telephony, comprising:

means for sending a transmitting request message to a counterpart terminal, if a transmitting request menu is selected in a video telephony mode;

means for sending authentication information to a server, if a transmitting accept message is received from the counterpart terminal; and means for transmitting video telephony data to the server, if an authentication complete message is received from the server.

34. A mobile communication terminal for approving a transmitting video telephony data during video telephony, comprising:
- means for displaying a transmitting request message through a display unit, if the transmitting request message is received from a counterpart terminal in a video telephony mode; and
- means for sending a transmitting accept message to the counterpart terminal, if a key to accept the transmitting request is input.

35. A server for transmitting video telephony data during video telephony, comprising:
- means for determining whether the terminal is subscribed to a transmitting service if authentication information is received from a terminal;
- means for sending an authentication complete message to the terminal, if the terminal is subscribed to the transmitting service; and
- means for transmitting the received video telephony data to another terminal if video telephony data is received from the terminal.

* * * * *